United States Patent [19]

Kawakami et al.

[11] Patent Number: 4,748,168

[45] Date of Patent: May 31, 1988

[54] RUBBER COMPOSITIONS FOR TIRE TREADS

[75] Inventors: Shinji Kawakami; Makoto Misawa; Takekazu Inoue; Yasuhiro Ishikawa, all of Hiratsuka; Hiroshi Hirakawa, Isehara, all of Japan

[73] Assignee: The Yokohama Rubber Co., Ltd., Tokyo, Japan

[21] Appl. No.: 44,323

[22] Filed: Apr. 30, 1987

[51] Int. Cl.[4] ............ C08K 3/04; C08K 5/01; C08L 9/06
[52] U.S. Cl. .................. 524/474; 524/495; 524/526; 525/237
[58] Field of Search ............ 524/495, 526, 237, 474

[56] References Cited

U.S. PATENT DOCUMENTS

| | | | |
|---|---|---|---|
| 4,398,582 | 8/1983 | Yoto et al. | 324/526 |
| 4,647,614 | 3/1987 | Takao et al. | 524/495 |
| 4,670,502 | 6/1987 | Hargis et al. | 524/526 |

*Primary Examiner*—Allan M. Lieberman
*Attorney, Agent, or Firm*—Finnegan, Henderson, Farabow, Garrett & Dunner

[57] ABSTRACT

Rubber compositions suitable for tire treads are disclosed. Starting rubbers made up of at least one SBR of $-20°$ C. to $-40°$ C. in Tg and at least one SBR of lower than $-45°$ C. in Tg are blended with specified amounts of carbon blacks having a $N_2SA$ of more than 120 $m^2/g$ and of softeners having a VGC of 0.90 to 0.98, whereby the compositions are provided with a storage shear modulus of less than 500 MPa at $-30°$ C. The compositions are excellent in friction performance, abrasion resistance and low-temperature resistance.

5 Claims, 3 Drawing Sheets

RUBBER COMPOSITIONS FOR TIRE TREADS

BACKGROUND OF THE INVENTION

1. Field of the Invention

This invention relates to rubber compositions suitable particularly for use in pneumatic tire treads.

2. Prior Art

Automotive tires should be safe to drive, inexpensive to manufacture and comfortable to ride on. As a result of the development of networks of expressways, there has been an urgent need for improved means capable of giving reliable steering, cornering and braking characteristics while in high-speed driving.

To attain improved tire performance particularly in terms of friction performance of tires with the surfaces of roads or pavements, it is important that tread rubber be made highly susceptible to hysteresis loss thereby leading to sufficient friction force between the tread and the road surfaces. Hysteresis loss results from periodic deformation of the tread on its surface while in high-speed, frictional contact with slight undulations on the roads. The more frequently the tread dissipates energy at the contacting areas through hysteresis loss, the greater the friction force. In accordance with the Williams-Landel-Fery temperature-time superposition principle, such tread deformation is known to be dependent upon the magnitude of hysteresis loss determined at a lower temperature than that at which the tire is used. In fact, loss factor (tan $\delta$) that is a measure of the hysteresis loss is fairly correlative, when measured particularly at about 0°C., to the friction coefficient that the tire has gained.

Attempts have been made to this end to enhance hysteresis loss with use of styrene-butadiene copolymer rubbers having high styrene contents and high glass-transition temperatures. Conventional rubbers of a styrene-butadiene type, however, tend to invite insufficient abrasion resistance with increased styrene contents and also inadequate low-temperature resistance at elevated glass-transition temperature. These rubbers when exposed to reduced ambient temperature would give too high elastic moduli to follow the road surface irregularities; that is, energy dissipation would be rather small despite the tan $\delta$ values held high, resulting in reduced braking force. At much lower ambient temperature the rubber would undergo brittle fracture, causing serious accidents.

SUMMARY OF THE INVENTION

It is therefore the primary object of the present invention to provide a novel rubber composition for use in tire treads which is free from the foregoing difficulties of the prior art and which is excellent in friction performance, abrasion resistance and low-temperature resistance.

This and other objects and features of the invention will be better understood from the following detailed description.

According to the invention, there is provided a rubber composition for use in tire treads which comprises: a starting rubber consisting essentially of one or more of a first styrene-butadiene copolymer rubber having a glass-transition temperature between $-20°$ C. and $-45°$ C., and one or more of a second styrene-butadiene copolymer rubber having a glass-transition temperature lower than $-45°$ C.; 80–130 parts by weight of a carbon black having a specific surface area greater than 120 m$^2$/g, the amount being based on 100 parts by weight of the starting rubber; and 20–90 parts by weight of a softener having a viscosity-gravity constant between 0.90 and 0.98, the amount being based on 100 parts by weight of the starting rubber. The resulting composition has a storage shear modulus smaller than 500 MPa at $-30°$ C.

DETAILED DESCRIPTION OF THE INVENTION

Starting rubbers eligible for the purpose of the present invention include a first group of styrene-butadiene copolymer rubbers with a glass-transition temperature between $-20°$ C. and $-45°$ C. (hereinafter referred to as "styrene-rich SBR") and a second group of styrene-butadiene copolymer rubbers with a glass-transition temperature lower than $-45°$ C. (hereinafter referred to as "styrene-poor SBR"). The starting rubber is essentially made up of one or more styrene-rich SBRs and one or more styrene-poor SBRs.

Figure 2:
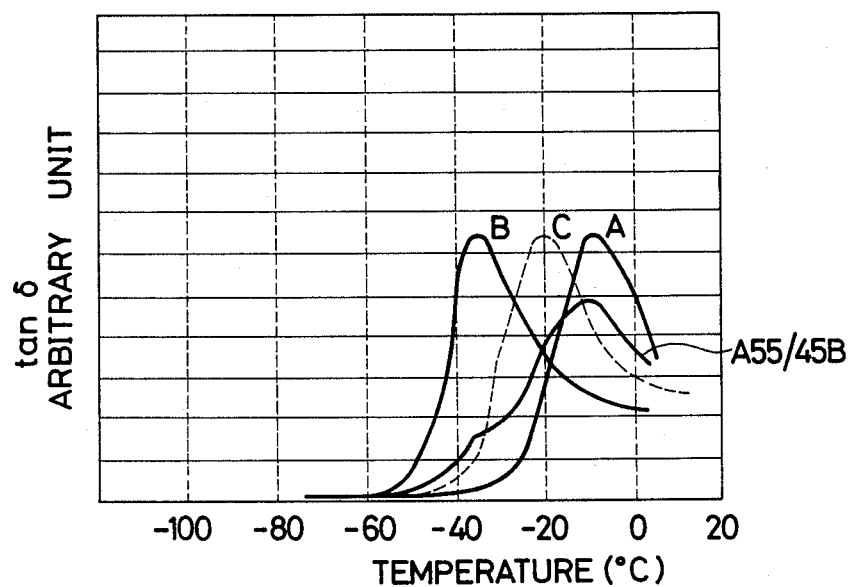
FIGS. 2 and 3 are views similar to FIG. 1, but showing the temperature dependence of loss factor and shear modulus as regards rubber composition A55/45B embodying the present invention and conventional compositions A, B and C.

SBRs widely vary in intramolecular rotation depending upon the content of styrene and hence show different glass-transition temperatures (Tg). It has now been found that two SBRs of different styrene contents when blended are not fully compatible, failing to bear mean tan $\delta$ peaks and physical characteristics as is apparent from FIG. 2. Table 1 shows that, for example, a blend of 55 parts by weight of SBR (styrene content: 45 wt. % and Tg: $-33°$ C., "rubber A") with 45 parts by weight of SBR (styrene content: 23.5 wt. % and Tg: $-54°$ C., "rubber B") has an average styrene content of about 35% by weight, but provides tow tan $\delta$ peaks at $-35°$ C. and $-10°$ C. and also different physical characteristics from SBR (styrene content: 35 wt. %, "rubber C"). The tan $\delta$ value of the blend rubber, A55/45B, is 1.039 at 0° C. that is smaller than rubber A (1.211) but greater than rubber C (0.929); that is rubber A55/45B excels in resistance to wet slipping or skidding compared to rubber C of the same styrene content.

TABLE 1

| SBR | tan $\delta$ [1] (0° C.) | temperature of [2] G' = 500 MPa (°C.) | tan $\delta$ peak [3] (°C.) |
|---|---|---|---|
| A55/45B | 1.039 | $-32.0$ | $-35, -10$ |
| C | 0.929 | $-28.4$ | $-20$ |

Figure 1:
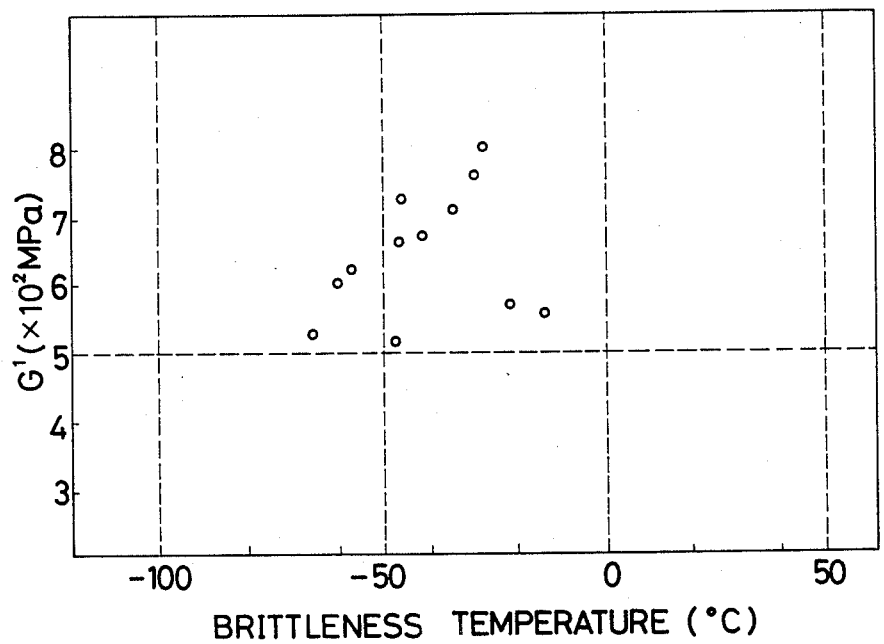
FIG. 1 is a graphic representation showing the shear moduli of conventional rubber compositions as plotted against the brittleness temperatures.

[1] tan $\delta$ (0° C.): viscoelasticity spectrometer (Iwamoto Seisakusho Co.)
[2] temperature of G' = 500 MPa: dynamic mechanical analyzer (Rheometrics Inc.)
[3] tan $\delta$ peak: same meter as in (1) above In general, rubber-like materials increase sharply in elastic modulus at reduced ambient temperature. This is known as the glass-transition phenomenon in which the rubbers are changed to a glassy state with their thermal molecular motion frozen still. Thus the rubber becomes inflexible and hence susceptible to brittle fracture under only appreciable strain. The temperature at which such brittle fracture takes place is commonly called the brittleness temperature that is closely related to elastic moduli. It has been found as appears clear from FIG. 1 that various conventional rubber compositions have a G' value greater than 500 MPa at the brittleness temperatures.

Figure 3:
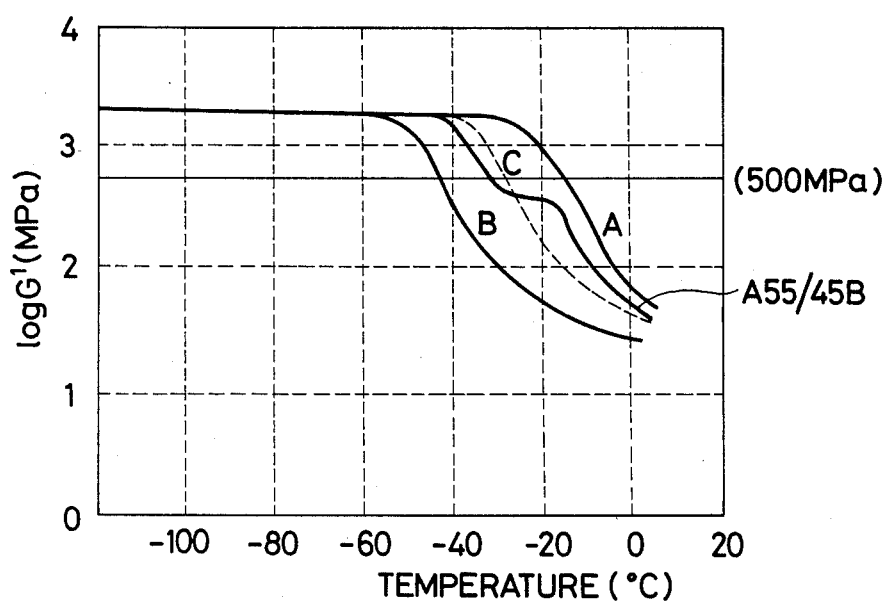

Further, rubber A55/45B differs in shear modulus curve from rubber C as seen from FIG. 3, reaching a shear modulus of 500 MPa at a lower temperature than rubber C with the result that the blend rubber is desirable in respect of low-temperature resistance.

As stated above, SBRs are substantially critical at a Tg of −45° C. above which they would acquire physically different properties. Importantly, the starting rubber of the invention should not be lower than −45° C. in Tg. Higher Tg than −20° C. in the case of styrene-rich SBR would become less compatible with styrene-poor SBR and hence lead to phase separation, making the resulting composition mechanically weak.

Styrene-rich SBRs may be produced as by solution or emulsion polymerization, but should preferably have a styrene content in the range of 30–50% by weight when emulsion-polymerized using an organic peroxide initiator. Styrene-poor SBRs are likewise obtainable but preferably with a styrene content of 20–30% by weight.

The amount of styrene-rich SBR to be added should be in the range of 90–40 weight parts, whereas the amount of styrene-poor SBR should be in the range of 10–60 weight parts. Larger amounts than 90 parts by weight of styrene-rich SBR, or smaller amounts than 10 parts by weight of styrene-poor SBR would be ineffective in improving abrasion resistance and low-temperature resistance. Smaller amounts than 40 parts by weight of styrene-rich SBR, or larger amounts than 60 parts by weight of styrene-poor SBR would lead to reduced friction performance.

Carbon blacks useful as reinforcing fillers in the invention include for example SAF and ultra SAF carbon blacks. The agents should have a specific surface area ($N_2SA$) of greater than 120 m$^2$/g as measured by nitrogen adsorption. Smaller $N_2SA$ than 120m$^2$/g would fail to give adequate friction performance and sufficient abrasion resistance.

The amount of the carbon black to be added should be in the range of 80–130 weight parts based on 100 parts by weight of the starting rubber. Smaller amounts than 80 weight parts would cause insufficient friction performance and low abrasion resistance. Larger amounts than 130 weight parts would lead to reduced dispersibility, making the resulting composition mechanically vulnerable.

Eligible softeners are of a petroleum type, examples of which include aromatic process oils. The softeners should have a viscosity-gravity constant (VGC) of 0.90–0.98. The VGC values dominate Tg values of the composition, and smaller VGC than 0.90 would result in reduced friction performance.

The amount of the softener to be added may vary with the amount of the reinforcing filler, but should be in the range of 20–90 weight parts per 100 parts by weight of the starting rubber. Smaller amounts than 20 weight parts would render the composition less stretchable, hence less chipping-resistant. Larger amounts than 90 weight parts would lead to reduced mechanical strength.

The rubber composition according to the invention should have a storage shear modulus (G') of not more than 500 MPa at −30° C. The reason for this temperature limit is that the use of tires is rare at below −30° C.

There may be employed conventional additives such as vulcanizers, vulcanization accelerators, antioxidants, processing aids and the like.

The following examples are given to further illustrate the present invention, but it is to be understood that the invention is not limited thereto.

EXAMPLES 1–8 and Comparative EXAMPLES 1–9

Numerous rubber compositions according to the invention and controls were prepared and vulcanized as shown in Tables 2-4. Viscoelasticity and abrasion were measured under the conditions given below and with the results shown in the tables.

Loss Factor (tan δ)

Visoelasticity spectrometer (Iwamoto Seisakusho Co.) was used with frequency: 20 Hz, initial strain: 10% and dynamic strain: ±2%. Above 0.70 is acceptable.

Abrasion

Test was made with use of Goodrich pico type abrasion machine. The case of Comparative Examples 3 is taken as the standard index. The greater in indices, the higher abrasion resistance.

Storage Shear Modulus (G' at −302° C.)

Dynamic mechanical analyzer (Rheometric Inc.) was used with frequency: 10 Hz, shear strain: 0.5% and unit: MPa.

Glass-Transition Temperature (Tg)

Thermal analyzer (DuPont) was used with temperature rise 10° C./minute and Tg: intersecting point between the tangetial line of a transition point and the extrapolated base line (extrapolation-initiated temperature).

Viscosity-Gravity Constant (VGC)

Measurement was made in accordance with ASTM D2140-81.

TABLE 2

| Formulations/ Properties | Comparative Examples | | | | Examples | | |
|---|---|---|---|---|---|---|---|
| | 1 | 2 | 3 | 4 | 1 | 2 | 3 |
| SBR-1 (1) | 100 | | | | 10 | 30 | 50 |
| SBR-2 (2) | | 100 | | 30 | 30 | 30 | 30 |
| SBR-3 (3) | | | 100 | 70 | 60 | 40 | |
| SBR-4 (4) | | | | | | | 20 |
| carbon-2 (6) | 100 | 100 | 100 | 100 | 100 | 100 | 100 |
| oil-1 (8) | 55 | 55 | 55 | 55 | 55 | 55 | 55 |
| zinc oxide | 3.0 | | | | | | |
| stearic acid | 2.0 | | | | | | |
| antioxidant (10) | 2.0 | | | same as in Comparative Example 1 | | | |
| sulfur | 1.8 | | | | | | |
| vulcanization accelerator (11) | 1.5 | | | | | | |

TABLE 2-continued

| Formulations/ | Comparative Examples | | | | Examples | | |
|---|---|---|---|---|---|---|---|
| Properties | 1 | 2 | 3 | 4 | 1 | 2 | 3 |
| tan δ (0° C.) | 0.65 | 0.83 | 1.16 | 1.12 | 1.10 | 1.07 | 0.80 |
| abrasion index | 118 | 114 | 100 | 107 | 110 | 110 | 114 |
| G' (−30° C.) | 150 | 700 | 1400 | 1200 | 450 | 300 | 200 | formulation: part by weight
(1) emulsion-polymerized SBR, styrene content 23.5%, Tg −54° C. NIPOL 1712 (Nippon Zeon Co.)
(2) emulsion-polymerized SBR, styrene content 35%, Tg −43° C. NIPOL 9520 (Nippon Zeon Co.)
(3) emulsion-polymerized SBR, styrene content 45%, Tg −33° C. NIPOL 9525 (Nippon Zeon Co.)
(4) solution-polymerized SBR, styrene content 31%, Tg −46° C. (Asahi Chemical Co.)
(5) HAF carbon black N339, $N_2SA$ 80 $m^2/g$
(6) SAF carbon black N110, $N_2SA$ 160 $m^2/g$
(7) ultra SAF carbon black, $N_2SA$ 200 $m^2/g$
(8) aromatic oil, VGC 0.95 (Fuji Kosan Co.)
(9) paraffininc oil, VGC 0.84 (Fuji Kosan Co.)
(10) N—(1,3-dimethylbutyl)-N'—phenyl-p-phenylenediamine
(11) N—cyclohexyl-2-benzothiazyl sulfenamide
(1)–(4): oil extended rubbers each containing 37.5 parts of aromatic oil

TABLE 3

| Formulations/ Properties | Comparative Example 5 | Example 4 | Comparative Example 6 | Example 5 | Comparative Examples 7 | 8 |
|---|---|---|---|---|---|---|
| SBR-1 (1) | 30 | 30 | 30 | 30 | 30 | |
| SBR-2 (2) | 70 | 70 | 70 | 70 | 70 | 70 |
| SBR-3 (3) | | | | | | 30 |
| carbon-1 (5) | 100 | | | | | |
| carbon-2 (6) | | | 100 | 120 | 140 | 100 |
| carbon-3 (7) | | 100 | | | | |
| oil-1 (8) | 55 | 55 | | 75 | 95 | 55 |
| oil-2 (9) | | | 55 | | | |
| zinc oxide stearic acid antioxidant (10) sulfur vulcanization accelerator (11) | same as in Table 1 | | | | | |
| tan δ (0° C.) | 0.65 | 0.90 | 0.68 | 0.90 | 0.98 | 1.03 |
| abrasion index | 112 | 120 | 110 | 102 | 90 | 80 |
| G' (−30° C.) | 340 | 380 | 200 | 300 | 400 | 650 | formulation: part by weight
(1)–(3), (5)–(11): see footnote in Table 1

TABLE 4

| Formulations/ Properties | Examples | | | Comparative Example 9 |
|---|---|---|---|---|
| | 6 | 7 | 8 | |
| SBR-1 (1) | 10 | 30 | 50 | 70 |
| SBR-2 (2) | 90 | 70 | 50 | 30 |
| carbon-2 (6) | 100 | 100 | 100 | 100 |
| oil-1 (8) | 55 | 55 | 55 | 55 |
| zinc oxide stearic acid antioxidant (10) sulfur vulcanization accelerator (11) | same as in Table 1 | | | |
| tan δ (0° C.) | 0.91 | 0.88 | 0.82 | 0.68 |
| abrasion index | 115 | 120 | 125 | 130 |
| G' (−30° C.) | 450 | 300 | 200 | 180 | formulation: part by weight
(1),(2),(6),(8),(10),(11): see footnote to Table 1

Examples 1–3 and Comparative Examples 1–4 are directed to the use of styrene-butadiene copolymer rubbers of varied styrene contents. Styrene-rich SBRs either alone or in combination, given sufficient los factor (tan δ), were inadequate in abrasion resistance and storage shear modulus (G') as seen from Table 2. Examples 1–3 representing the invention, though comparable in loss factor and abrasion index to Comparative Example 3, are highly satisfactory in respect of G' value, hence low-temperature resistance.

Turning next to the nature of reinforcing fillers, HAF carbon black not exceeding 120 $m^2/g$ in $N_2SA$, Comparative Examples 5 as against Example 4, failed to give increased tan δ value.

A paraffinic oil softener of less than 0.90 in VGC, Comparative Example 6 in Table 3, showed acceptable G' value but insufficient tan δ value.

Departures of carbon black and oil from the above specified ranges failed to improve abrasion resistance as evidenced by Comparative Example 7 as against Example 5. Both of the components even in such specified ranges, when combined with styrene-rich SBR as was in Comparative Example 8, gave sufficient tan δ value but inadequate G' value, resulting in rduced low-temperature resistance.

Examples 6–8 and Comparative Example 9 are illustrative of the use of styrene-rich and styrene-poor SBRs blended in varying ratios. As was apparent from Table 4, a blend predominantly of styrene-poor SBR, Comparative Example 9, produced no notably better results than Comparative Example 1 in which styrene-poor SBR alone was used.

Having thus described the invention, it will be apparent to those versed in the art that various changes and modifications may be made thereto without departing from the scope of the appended claims.

What is claimed is:

1. A rubber composition for use in tire treads which comprises:
   (a) a starting rubber consisting essentially of one or more of a first styrene-butadiene copolymer rubber having a glass-transition temperature between −20° C. and −45° C., said first copolymer rubber being in an amount of 90–40 parts by weight, and one or more of a second styrene-butadiene copolymer rubber having a glass-transition temperature lower than 45° C., said second copolymer rubber being in an amount of 10–60 parts by weight;

(b) 80–130 parts by weight of a carbon black having a specific surface area greater than 120 m²/g as determined by nitrogen adsorption, the amount being based on 100 parts by weight of said starting rubber; and (c) 20–90 parts by weight of a softener of a petroleum type having a viscosity-gravity constant between 0.90 and 0.98, the amount being based on 100 parts by weight of said starting rubber, whereby the composition is provided with a storage shear modulus smaller than 500 MPa at −30° C.

2. The rubber composition of claim 1 wherein said first copolymer rubber has a styrene content of 30–50 percent by weight.

3. The rubber composition of claim 1 wherein said second copolymer has a styrene content of 20–30 percent by weight.

4. The rubber composition of claim 1 wherein said carbon black is a super or ultrasuper abrasion furnace carbon back.

5. The rubber composition of claim 1 wherein said softener is an aromatic process oil.

* * * * *